April 25, 1950     H. S. KNOWLES     2,505,551
HEARING AID CASING AND GUARD
Filed April 19, 1945     5 Sheets-Sheet 1
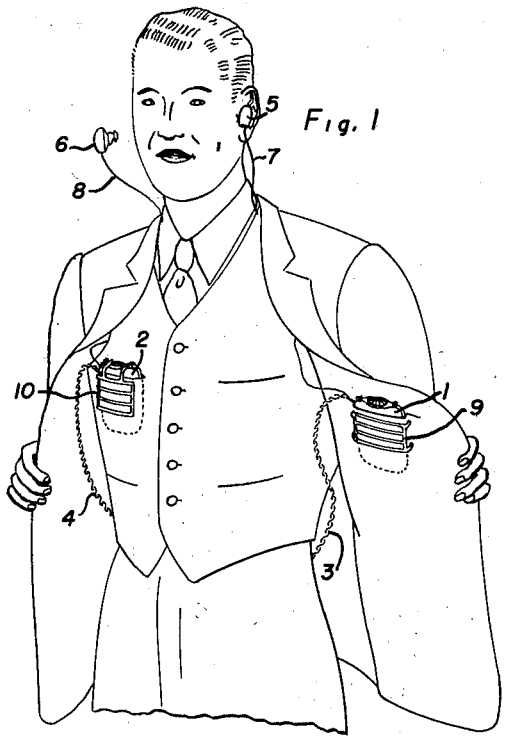
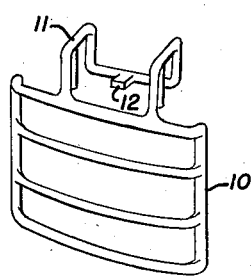
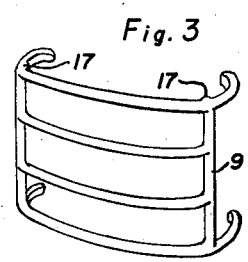
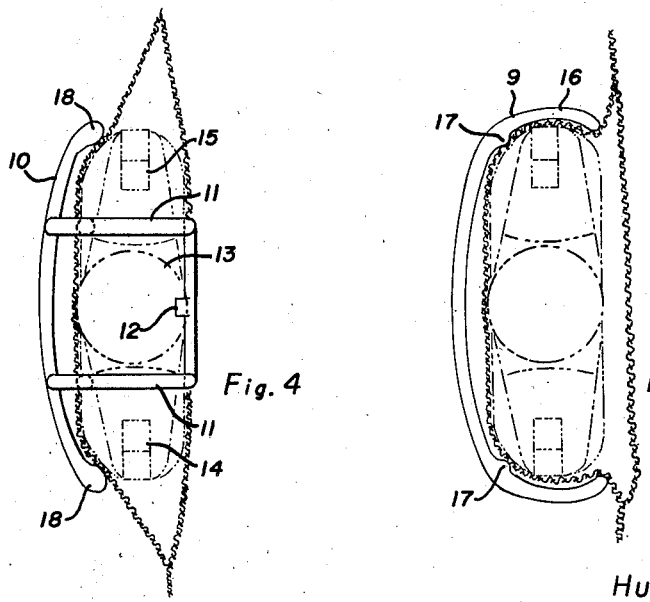
INVENTOR.
HUGH S. KNOWLES
BY Murray Robinson
HIS ATTORNEY April 25, 1950 H. S. KNOWLES 2,505,551
HEARING AID CASING AND GUARD
Filed April 19, 1945 5 Sheets-Sheet 2
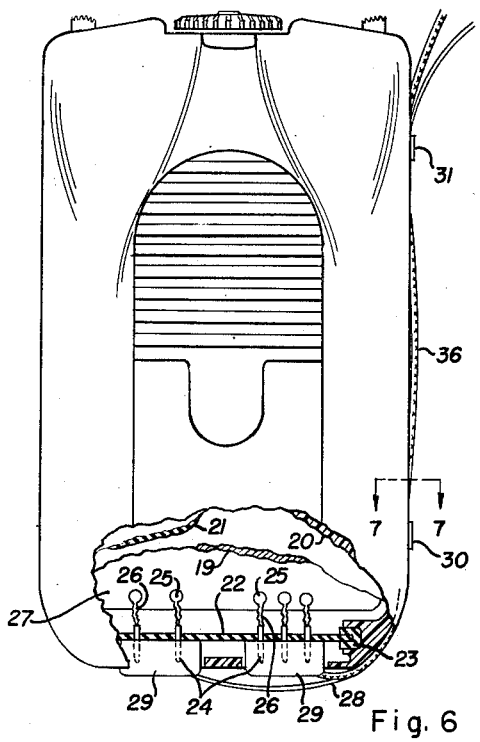
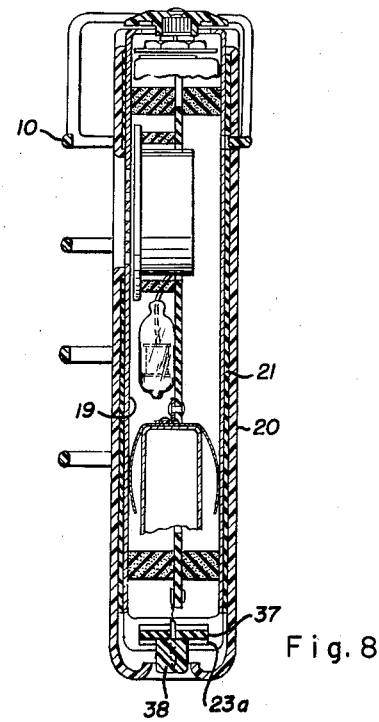
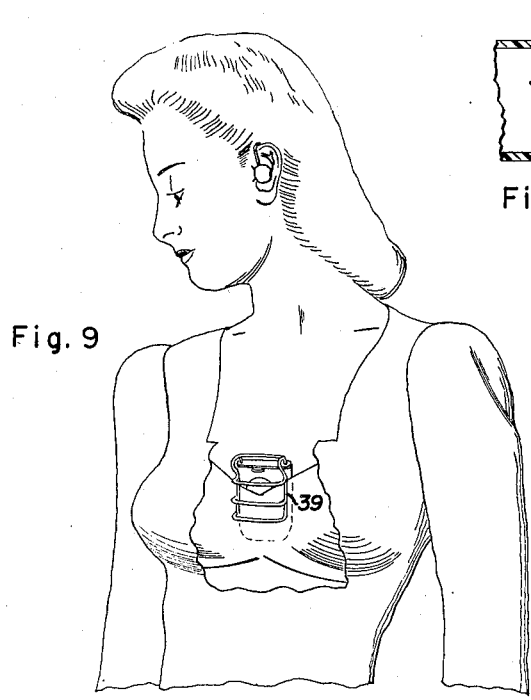
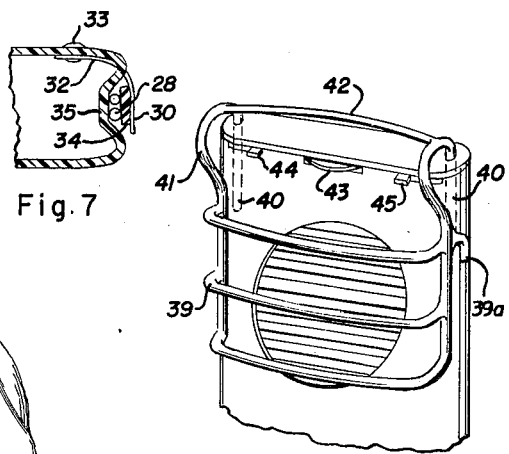
INVENTOR:
HUGH S. KNOWLES
BY Murray Robinson
HIS ATTORNEY

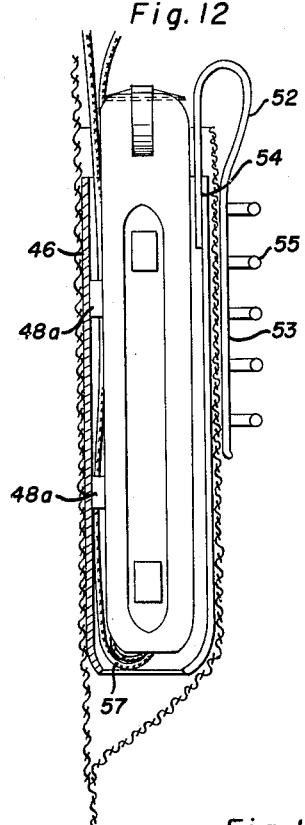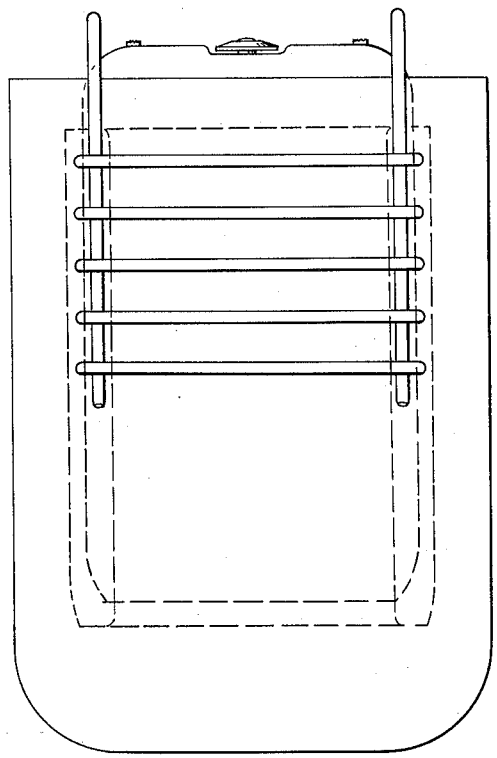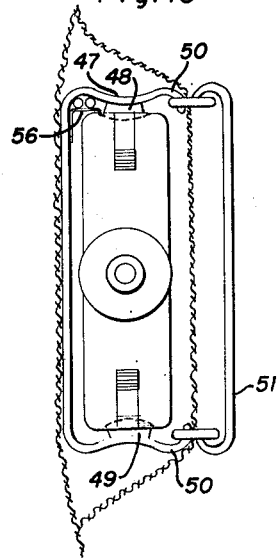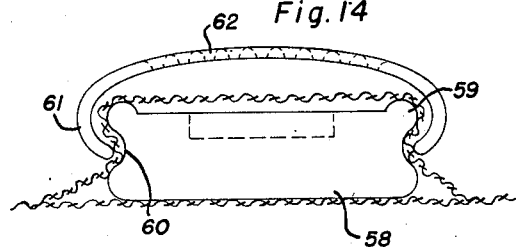

April 25, 1950        H. S. KNOWLES        2,505,551
HEARING AID CASING AND GUARD
Filed April 19, 1945        5 Sheets-Sheet 4
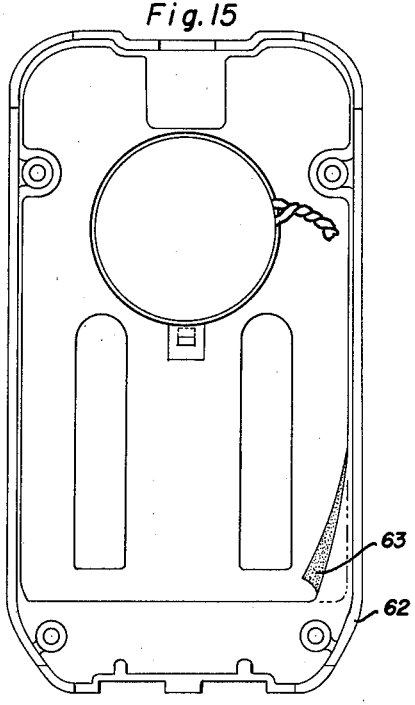
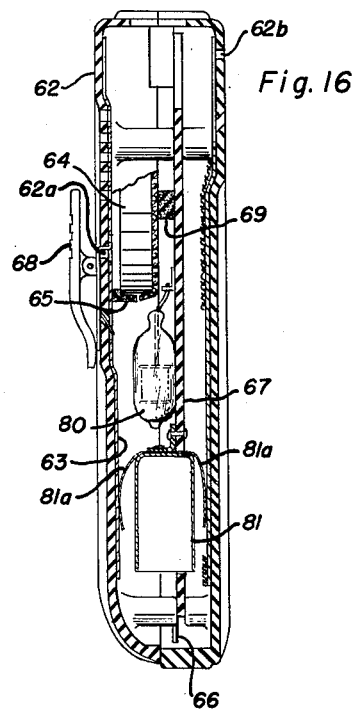
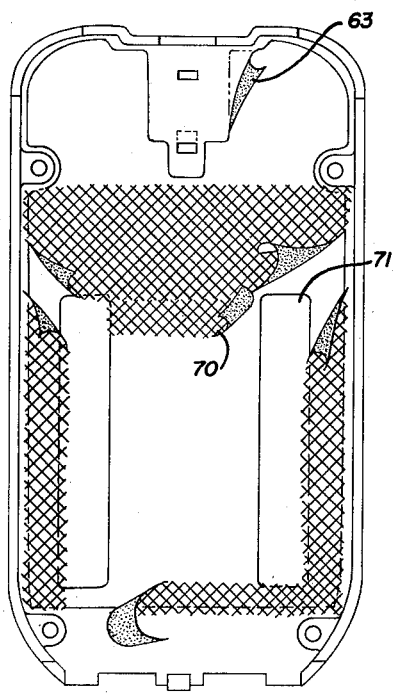
INVENTOR.
HUGH S. KNOWLES
BY Murray Robinson
HIS ATTORNEY

UNITED STATES PATENT OFFICE 2,505,551

HEARING AID CASING AND GUARD

Hugh S. Knowles, River Forest, Ill., assignor to Zenith Radio Corporation, a corporation of Illinois Application April 19, 1945, Serial No. 589,134

10 Claims. (Cl. 179—107)

This invention relates to portable hearing aids of the type adapted to be worn on the person of the user, usually carried in large part on or under the clothing of the user.

The principal object of the invention is to eliminate or reduce interference in such a hearing aid.

Interference in a hearing aid may be defined as that portion of the sound output which is undesired. In general terms it is sound emitted by the receiver and heard by the user of the hearing aid that is different from the sound that would be heard by a person with normal hearing standing in the same place and not using a hearing aid. Hearing aid interference may include sounds due to (1) Noise generated in the immediate vicinity of the microphone and airborne to the microphone diaphragm or other sensitive unit, (2) Acoustic frequency mechanical vibrations of the microphone support transmitted by the support to the sensitive unit of the microphone, and (3) Modulated electromagnetic waves picked up by the conductors of the hearing aid amplifier circuit and demodulated therein.

To enable a person having normal hearing to appreciate the problem involved in (1) and (2) it may be pointed out that the hyper-sensitive area of hearing of one using a hearing aid is in the neighborhood of the microphone which is usually worn under or adjacent the clothing. The hyper-sensitive area of hearing of one not using a hearing aid is the external ear which usually is not covered with or even near clothing of any sort and such a person is not troubled with any noise due to clothing rubbing together near the ear or due to mechanical excitation of the outer ear and the adjacent portions of the head.

To illustrate the point further, a simple experiment will be described. If the finger and thumb are rubbed together with the hand near the waist the sound will be scarcely perceptible but if the hand is placed near one ear the rubbing produces a loud scratching sound. If now the other hand is used to block the aural canal of that ear the sound again becomes imperceptible, the air passage to the ear drum being closed, but if instead of rubbing finger and thumb together the finger is rubbed on the outer ear a loud scraping noise is again heard, this being due to mechanical excitation of the head which constitutes the support for the ear drum and other parts of the middle and inner ear.

In the experiment just described, the airborne noise due to rubbing the finger and thumb together in the neighborhood of the ear is analogous to the airborne noise due to clothing rubbing together near the microphone of a hearing aid. The mechanical excitation of the head by rubbing the finger on the outer ear is analogous to the mechanical excitation of a hearing aid microphone case due to clothing rubbing on the case or the cord connected to the case.

To appreciate the problem involved in the third type of interference listed hereinbefore one need only imagine he were required at all times to wear a radio headset connected to a radio tuned to the most powerful local station. While radio detection by a hearing aid is not everywhere a problem, it is of importance to users located in the same neighborhood as the transmitter of a radio station.

According to this invention, the desired suppression of hearing aid interference is obtained by (1) Preventing the generation of noise in the immediate vicinity of the microphone that might be airborne to its diaphragm or sensitive portion, (2) a. Preventing the mechanical excitation of the microphone supporting case and the cord connected thereto. b. Sectionalizing the support and interposing mechanical vibration filters between the sections. c. Providing damping for one or more of the sections, and (3) Shielding the amplifier circuit of the hearing aid from unwanted static and radio broadcasts.

The prevention of noise generation near the microphone is partly a problem of keeping the microphone away from the source of noise and partly one of eliminating the noise. Case-clothing noise is removed by tightly stretching the adjacent clothing over the front of the microphone to prevent relative motion between the cloth and case, or by providing the case with an outer shell acoustically isolated from the case. Inter-clothing noise is removed by providing a smooth guard to space the outer clothing from the inner thereby preventing contact, and at the same time any noise due to the outer clothing rubbing on the guard is kept to a minimum and is generated some distance away from the microphone.

The means used to prevent airborne noise due to rubbing of the cloth over the adjacent case also serves to prevent mechanical excitation of the case. Any remaining slight vibration of the case is kept from affecting the microphone by providing a compliant or resistive member between the microphone and chassis and between the chassis and case. In addition the cord connecting the microphone case to other parts of the hearing aid apparatus is plugged into a separate chassis compliantly or resistively supported in the casing and very flexible leads connect the plug sockets to the main chassis. Furthermore the cord may be dressed along one side of the casing using compliant clamping means with somewhat slack portions between clamps. Since the vibrations caused by the cord are largely longitudinal, this is very effective in attenuating the vibrations before they reach the main chassis.

Provision is also made for damping any case vibrations by cementing an inner or outer shell to the casing using a permanently viscous cement. For maximum damping the transverse vibrational impedances of the shell and case should be equal. Thus, if the case is formed of plastic and the shell of metal foil, the foil will be of considerably less thickness than the case. It is to be noted that this damping "sandwich" construction may also serve the purpose of isolating the case from adjacent clothing as mentioned before. In this instance the shell should be on the outside of the case, the case being the member that mechanically supports the chassis, microphone and other interior parts.

If either the case or shell is made of metal sprayed with conducting material, it will serve as a shield to prevent the amplifier circuit from picking up electromagnetic radiation. Thus, in one form of the invention, the case is made of molded plastic and the shell is an inner lining of the metal foil. All the manufacturing advantages of plastic are thus obtained while at the same time providing an electromagnetic shield. On the other hand, if a metal outer case is preferred for a thinner, more rugged construction or to present a more pleasing appearance, the outer case serves as a shield and at the same time there is no need to fear the low dissipation qualities of metal since adequate damping may be provided by the cement between the inner and outer cases.

For a more detailed description of several preferred embodiments of the invention, reference will be made to the accompanying drawings in which:

Figure 1 is a view showing the use of two different forms of a combination spacer-stretcher unit for stretching the clothing adjacent the microphone case and spacing outer clothing away from the case;

Figs. 2 and 3 are perspective views to a larger scale of the two units shown in Figure 1;

Figs. 4 and 5 are top views of the same units showing also in phantom the associated microphone case and a section through the pocket carrying the case;

Fig. 6 is a front elevation, partially in section, showing the microphone case and the cord connection to the case;

Fig. 7 is a detail section on line 7—7 of Fig. 6 illustrating the manner of dressing the cord along the side of the case;

Fig. 8 is a medial section of a case similar to that shown in Fig. 6 showing the manner of mounting the microphone within the casing and also showing one method of damping and isolating the casing by means of an outer shell, the case of Fig. 8 differing from that of Fig. 6 only in the connector panel mounting, Fig. 8 showing a modified form of such mounting;

Fig. 9 shows a third form of the spacer-stretcher unit illustrated in Figs. 1 through 3 and also shows the manner of use of such units when worn by a female user instead of a man as previously illustrated;

Fig. 10 is a perspective view to a larger scale of the unit of Fig. 9 illustrating its connection with the microphone case;

Fig. 11 is a front view showing another form of the invention in which the outer shell isolating the case from adjacent clothing is not cemented to the casing as in Fig. 6 but is instead supported on the casing by compliant pads at the side of the casing. This view also shows a simple unit for spacing the outer clothing from the casing, this unit also serving as a clip to hold the case in place;

Fig. 12 is a medial section through the pocket and guard of the arrangement shown in Fig. 11, the hearing aid appearing in side elevation;

Fig. 13 is a top view of the apparatus of Fig. 11;

Fig. 14 is a top view of a fourth form of spacer-stretcher unit similar to the units shown in Figs. 1, 2, 3, 9 and 10 and also shows a modified form of case specially adapted to this unit;

Fig. 15 is a view of the inside of the front part of a third form of casing in which the shell is cemented to the inside of the casing and the microphone is supported on the casing rather than on the chassis which carries the amplifier;

Fig. 16 is a medial section through an assembled case of the type shown in Fig. 15;

Fig. 17 is a view of the inside of the back part of the casing of the type shown in Figs. 15 and 16.

Figure 18:
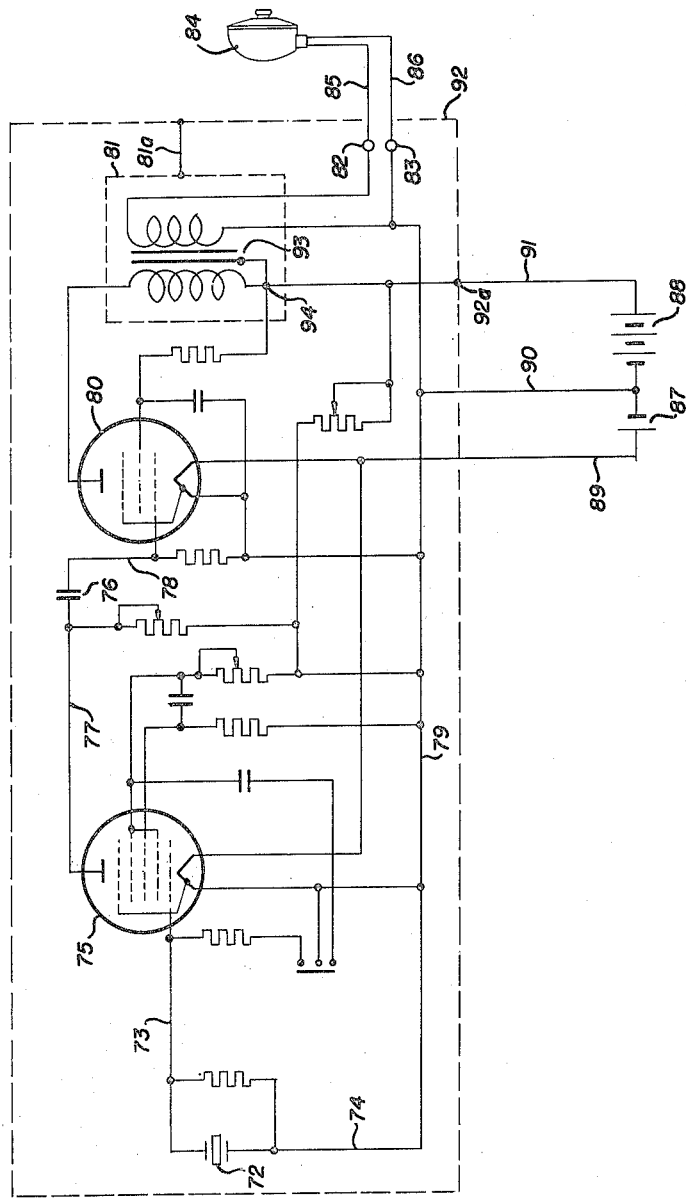
Fig. 18 is a diagram showing the electric circuit of the complete hearing aid.

Referring to Figure 1 there is shown a man wearing two complete hearing aids. Each hearing aid comprises a microphone and amplifier mounted in a casing as shown at 1 and 2, a set of batteries (not shown), which may be connected to the microphone and amplifier by means of an electric cord shown at 3 and 4, and an earpiece or telephone receiver adapted to fit into the external ear as shown at 5 and 6, which is connected to the amplifier by means of an electric cord as at 7 and 8. A man wearing a hearing aid usually carries the casing containing the microphone and amplifier either in his inside coat pocket or in his upper breast pocket as illustrated in the drawing. In either instance the case containing the amplifier and microphone is apt to be mechanically excited by the friction of the pocket cloth rubbing over the exterior of the casing. Likewise there is apt to be a considerable amount of noise generated in the immediate vicinity of the microphone and airborne thereto due to the rubbing of the pocket against adjacent parts of the clothing such as the coat or vest. The mechanical excitation of the case may be considerably reduced by immobilizing the cloth of the pocket over the case. This may be done by clamping a guard member around the pocket and case contained therein. Such a guard member may take the form shown at 9 in which case it is completely separate from the case and is supported therefrom through the cloth of the pocket. In such case the guard member must be sufficiently elastic and must sufficiently surround the casing so as to get a good grip on the casing and pocket. Another method of forming the guard is shown at 10. In this case the guard has a portion 11 passing up over the top of the pocket and the casing and having a lug 12 which fits in a recess in the back part of the casing. In this arrangement the portion 11 should be strong enough and elastic enough to hold the guard member 10 firmly against the cloth of the pocket so as to stretch it over the casing or at least to substantially immobilize it.

As shown in Figs. 2 and 3 the guard members 9 and 10 are formed of molded plastic bars. These bars are of fairly small cross section so as to be poor acoustic radiators thereby reducing the radiation of noise from the guard to the microphone. They are also formed so as to have all outside exposed surfaces substantially smooth. This reduces the generation of noise due to rubbing of clothing on the guard. It will be noted that the guard contacts the casing, or the cloth in contact therewith, only at points of the casing which are relatively insensitive. Acoustically insensitive parts of the casing are those which are mechanically strong and rigid such as the side wall and top and bottom edges of the casing. There is therefore very little transmission of mechanical vibration from the guard member directly to the casing because of the high impedance of the coupling between these members.

A further point of construction of both the types of guards illustrated which should be noted is the spacing between the guard and the front wall of the microphone casing. This spacing, as well as the thickness of the guard member itself, keeps the other clothing of the user away from the cloth of the pocket in which the microphone casing is placed. This construction further isolates the microphone from any noises which may be generated due to cloth rubbing over the outside of the guard member.

In the construction shown for the guard member 10 and as best illustrated in Fig. 4, the supporting members 11 pass over the top casing at either side of the volume control knob 13 and between this knob and the on-off and tone control switch levers 14 and 15. The guard member therefore does not in any way interfere with the normal use and operation of the manual controls associated with the amplifier and microphone casing.

Referring to Fig. 5 it will be seen that the guard member 9 is very similar in construction to the guard member 10 except that instead of the supporting members 11 the main guard portion is extended as shown at 16 in order to grip the casing and pocket more firmly. In both forms of the guard 9 and 10 there are vertical ribs as shown at 17 and 18 which bear against the case through the cloth of the pocket. These ribs serve to clamp the cloth against the casing at relatively insensitive points on the casing. The bow-like construction of the guard is such that when the guard is in place the bow is slightly straightened so as to stretch the cloth of the pocket between the ribs 17—17 and 18—18.

While the guards have been described as being made of molded plastic they might equally well be made of any material that is fairly elastic and has sufficient rigidity, for example, plain steel wires, or plastic coated metal springs.

Figs. 6, 7 and 8 show the construction of a particular form of a casing for the microphone and amplifier unit designed to help reduce hearing aid interference. This form of casing may well be used in connection with a guard of the type shown in Figs. 1 through 5. By way of example, there is shown in Fig. 8 a guard of the type illustrated in Fig. 4 supported on the top of the casing.

As best shown in Fig. 8 the casing comprises a metal inner casing 19 which supports the microphone and amplifier, and an outer plastic casing 20 separated from the inner casing by a layer of sponge rubber or like material as shown at 21. The outer casing serves to prevent mechanical excitation of the inner casing. The space between the inner and outer casing forms a discontinuity which acoustically isolates the inner casing from the outer casing and prevents the transmission of vibration to the inner casing from the outer casing in the event that the latter should be mechanically excited in some manner. With this construction if the case is placed in a pocket of the user as in Fig. 1, mechanical excitation of the outer plastic case due to the rubbing of the cloth of the pocket on the outer case will not affect the inner case or the microphone supported thereon. Hence, it is no longer so important to immobilize the cloth of the pocket lying adjacent the outer casing although this is still desirable to some extent because noise due to the rubbing of cloth on the outer casing may be airborne to the microphone.

Although a solid layer of material 21 has been shown between the inner and outer casings, it is satisfactory to provide only a few pads spaced from one another of just sufficient number to raise the resonant frequency of unsupported sections above the highest frequency easily heard by a normal ear. Such modification, however, brings up an important point. In all instances it is necessary to provide a low impedance path for sound waves to travel to the microphone. This means that the aperture in the various guards and casings over the microphone face must be closely coupled. Furthermore, it is important to provide a high impedance for sound waves "looking into" any cavities such as the interior of the inner casing or the space between the inner and outer casings when it is largely dead air space, since it is undesirable to couple such resonant cavities to the system. Low impedance coupling to such cavities may be achieved by close spacing of the casing apertures and the microphone face. If such close spacing cannot be achieved easily in large scale production, good results may also be obtained by providing washers of sponge rubber-like material or of felt-like material around the apertures between the casing and between the inner casing and the microphone face.

Provision having been made for the elimination or reduction of airborne noises in the immediate vicinity of the microphone and the reduction of noise due to mechanical excitation of the case which might be transmitted to the microphone, it is found that the most important of the residual interference is due to vibration transmitted to the microphone through the cord connected to the case. This cord may be mechanically excited due to clothing rubbing on the cord in the same manner as the case may be excited. The cord is sometimes directly connected to the electric circuit of the microphone and amplifier but in the more usual construction special connectors are provided so that the cord may be detached from the amplifier and microphone casing. In either case the external conductors should be brought into the case and connected on to a panel which is mounted within the case separate from the microphone. The connection between the panel and the microphone and amplifier circuit should be made by very flexible conductors.

Two arrangements for mounting the panel are shown in Figs. 6 and 8. In Fig. 6, the terminal panel is shown mounted on the outer casing. The panel 22 is shown as being supported in pads of rubber-like material at 23. Connections from the terminals 24 on the panel to the terminals 25 of the microphone amplifier circuit are made by means of the flexible wires 26. This construction provides a maximum isolation of the panel from the chassis 27 supporting the microphone and amplifier. The external conductors 28 are connected to the terminals 24 by means of plugs 29. As a further means of preventing transmission of vibrations from the cord to the microphone the cord may be dressed along the side of the casing and clamped thereto at spaced points such as at 30 and 31. As shown in Fig. 7 the clamps comprise spring members 32 riveted to the casing at 33 and having rubber pads 34 cemented thereto. The casing is recessed at 35 so that the conductors may be held under the clamp 34 without slipping out at either side. There should be a slight slack in the cord, as at 36, between the clamps 30 and 31 in order to further suppress vibrations of the cord. Although the cord 28, comprising in reality two portions, one going to the batteries and the other to the earpiece, has been shown to be dressed along a single side of the casing, it may be desirable in some cases to dress the battery cable along one side of the casing and the cord going to the earpiece along another side of the casing. In case a crystal type (high impedance) earpiece is used, separation of the two cords is particularly desirable to avoid coupling any stray audio frequency currents in the battery cord to the cord going to the earpiece.

In Fig. 8 there is shown a slightly modified construction of the panel supporting the electric connectors. In this instance, the panel 37 is supported at either end on the inner casing by means of elastic compliant pads 23a similar to the pads 23. Further, in this construction, the electric connector plugs 38 lie slightly below the surface of the bottom of the outer casing 20 so as to minimize the possibility of direct excitation of the plugs themselves. In both the constructions shown in Figs. 6 and 8 the apertures in the outer casing 20 should be sufficiently large so that in their equilibrium position the plugs 29 or 38 will not touch any adjoining part of the casing.

Referring now to Figs. 9 and 10 there is shown a modified form of the invention designed for use with female attire. In this form of the invention the outer guard 39 is attached to the case by inserting rod ends 40 into holes in the casing. This arrangement provides a firmer support for the outer guard and permits it to serve additionally as a clip to hold the case in position under the clothing. Hooks 39a are also provided to prevent the hearing aid from slipping down too far under the clothing. The top part of the guard has a high arched portion 41 and a transverse upper bar 42 which serve to protect the top of the case from excitation by the clothing of the wearer. Such a top guard is particularly desirable in the case of a female user since the upper portion of the dress may sag and touch the top portion of the casing if such additional protection is not provided. The guard 39 may be formed of molded plastic or of wire and is in other respects similar to the guards 9 and 10 illustrated in Figs. 1 through 5. It is to be noted that in this construction in which the upper part of the casing is guarded, the volume, tone and on-off control members are located at the front side of the casing as shown at 43, 44 and 45, these members being more accessible there. These members are usually roughened and protrude beyond the surface of the casing to facilitate operation through a layer of clothing, as when under a dress, for example. Hence they are particularly susceptible to mechanical excitation. However, the guard member extends beyond these control members and hence prevents to a large degree any contact of the control members with the clothing while still permitting the clothing to be pushed in against these members when it is desired to operate them. The guard also prevents undesired actuation of the control members, especially the volume control, by clothing rubbing against them during normal use of the hearing aid. Previously this has been accomplished only by recessing the control members beneath the surface of the casing, thereby making difficult any operation through a layer of clothing.

In Figs. 11, 12 and 13 there is shown another form of the invention in which the outer casing 46 protecting the main case against mechanical excitation is formed of a sheet of springy material such as metal or plastic and has curved side walls 47 carrying elastic pads 48 which snap into position in the recessed side walls 49 of the main case. The back wall of casing 46 also carries one or more elastic pads 48a to reduce its response to low frequency vibrations. If desired, the whole casing 46 could be made of a grid-like construction similar to that of the outer guard, in which case the additional pads 48a could be dispensed with. As illustrated, the outer casing 46 surrounds only the back and side walls of the main case, the top, bottom and front walls not being covered. However, the outer casing extends sufficiently beyond the main case on all exposed sides so as to prevent to a large extent any excitation of these walls. The arrangement is particularly suited for use in connection with a pocket in which instance the ends 50 of the side walls of the outer casing stretch the cloth of the pocket out of contact with the microphone face of the main case. The outer guard 51 is supported on the outer casing by U-shaped supporting members 52 which may constitute extensions of the side members of the outer guard 53 and which may be attached to the outer casing at 54. The members 52 extend above the tone, volume and on-off control members, and thus protect them in a manner similar to that provided by portion 41 of the guard shown in Figs. 9 and 10. The whole outer casing and outer guard construction may be such that the outer guard can serve as a clamp to hold the case in position in the pocket of the wearer. As in other embodiments the front wall 55 of the outer guard is spaced at a distance from the most forward part of the outer casing and the adjacent cloth of the pocket so as to more effectively isolate the microphone from any noises generated by friction of outer clothing rubbing on the outer guard.

In the construction just described the electric cords may be dressed along the side of the main case underneath the elastic pad 48 or, as illustrated, may be dressed along the inside of the outer casing 47 and held in place thereon by clamps 56. The cord should be arranged so as to provide a slight amount of slack between points where it is clamped to the outer casing and also a slack loop 57 between the last clamp and the point where the cords enter the bottom of the main case.

While it has been suggested that outer guards of the type shown in Figs. 1, 9 and 11 be used in conjunction with a double wall case, considerable reduction of interference will be obtained by using the guard alone. Fig. 14 illustrates a single wall construction of the case and a modified form of outer guard. The case 58 has raised portion 59 adjacent the microphone aperture in the case. With such construction when the cloth of a pocket is drawn tightly across the front face of the case between the raised portion 59, it will be out of contact with that part of the case in the immediate vicinity of the microphone. This will help prevent excitation of the case in the immediate neighborhood of the microphone. The case is shown as having recessed side wall 60 to facilitate clamping of the outer guard 61. The outer guard 61 comprises a sheet of plastic material, perforated in that portion overlying the microphone. The perforations are indicated at 62. As with other forms of the outer guard the entire exterior exposed portion of the guard should be made as smooth as possible to reduce the amount of noise generated by clothing rubbing thereon.

In Figs. 15, 16 and 17 there is shown a further modified form of case for the microphone and amplifier. In this construction the case 62 is provided with an inner casing or lining 63 which is cemented thereto with a permanently viscous cement such as certain forms of rubber cement. Both the inner and outer casing 62 and 63 may be formed of any desired material but in a preferred form the outer casing 62 is a molded plastic and the inner liner 63 is of lead foil. The thicknesses of the casing 62 and 63 should be such that their transverse impedances are substantially equal. In such case the damping effect provided by the viscous cement and the inner liner is a maximum. It may be noted that most modes of vibration of the case 62 will, due to the presence of the inner liner 63, place the viscous cement in shear. This distortion of the cement produces a large dissipation of the vibrational energy of the case 62 and prevents its transmission to the microphone shown at 64 supported on the case by means of rubber cup 65. When the microphone is thus supported on the casing, as best shown in Fig. 16, it is unnecessary to provide a separate panel for supporting the electric connectors 66. These connectors may be mounted directly on the same chassis 67 as the tube 39 and other parts of the amplifier since the microphone is not supported on this chassis. A pad 69 serves to give additional support to the microphone and is interposed between the cup 65 and the chassis 67 but this pad may be eliminated if more complete isolation is desired. As shown in Fig. 17 the foil lining 63 may be in part covered with an insulating cloth 70 to prevent undesired contact between the foil and various parts of the amplifier. Also the foil may be partially cut away as at 71 to provide additional space inside the casing.

The case construction just described may be used effectively alone or in combination with a guard such as illustrated in Figs. 1 and 9. In some cases it may also be desirable to provide an outer casing as in Figs. 8 and 12 although the inner liner construction of Fig. 16 is in general an alternative form of protection to that shown in Figs. 8 and 12. If desired, a clip 68, removably attached to either the front of the casing at 62a or the back of the casing at 62b, may be provided to support the casing on the outside of the user's clothing rather than in a pocket. Such a clip may be used with any of the previously described constructions.

In all three forms a double wall case construction as shown in Figs. 8, 12 and 16, if either wall is of metal it will serve as an electric shield to prevent reception of electromagnetic waves by the conductors inside the casing. A particularly effective shield will be obtained if both walls of the dual wall or "sandwich type" casing are made of metal. Instead of making one or both walls of metal either one or both may be sprayed with conducting material as in known constructions in order to provide a conducting shield.

The shielding function will be better understood by an examination of the electric circuit of the hearing aid shown in Fig. 18. The microphone comprises the piezo crystal 72 which is connected by conductors 73, 74 across the input of the first amplifier tube 75. The output of amplifier tube 75 is coupled by condenser 76 and conductors 77, 78, 79 to power tube 80. Tube 80 is coupled by transformer 81 to terminals 82, 83 to which the earphone 84 may be connected by leads 85, 86. Power is supplied by the batteries 87, 88 to heat the filaments of the tubes and maintain the desired potentials on the other elements of the circuit. The batteries are connected to the amplifier by means of conductors 89, 90, 91.

The conducting shield provided by the casing for the microphone amplifier unit is indicated at 92 by a dashed line. Were it not for this shield, electromagnetic waves might be intercepted by either the conductors 73, 74 connecting the microphone and first amplifier tube, or the conductors 77, 78, 79 coupling the first tube to the power tube. Such waves are sometimes demodulated due to non-linearities of the tube characteristics and appear as interference in the earphone 84. The conducting shield acts as a Faraday cage to prevent the existence of any electric field within the casing thereby eliminating this source of interference. It is to be noted that the shield also prevents any electric charges outside the casing from influencing the potential of the circuit elements within the casing and thus prevents any possible interference of that type such as might be caused by frictional electrification of the casing due to clothing rubbing against it.

One other function of the conducting shield may be mentioned. By connecting the shield to the positive side of the plate supply battery 88 as indicated at 92a, the conductors of the amplifier circuit are made negative with respect to the shield and the slight leakage current will protect the conductors against corrosion at the expense of the shield. This connection is particularly suitable for tropic climates where the atmosphere is humid and insulation may have low surface resistance and be subject to deterioration. As a further precaution, the transformer laminations 93 may also be connected as at 94 to the high side of the plate supply battery, and the casing of transformer 81 (indicated by dashed line in Fig. 18) may be connected to the foil liner by conducting leaf springs 81a (see Fig. 16).

It will now be seen that by the use of this invention, hearing aid intereference of nearly all forms may be markedly reduced or entirely eliminated. While preferred embodiments of the invention have been described for purposes of illustration it is obvious that many modifications may be made and it is desired to cover by these Letters Patent all forms of the invention falling within the scope of the appended claims.

I claim:

1. In a hearing aid, a microphone, a vacuum tube amplifier, a casing elastically and compliantly supporting and at least partially enclosing the microphone and amplifier, a metal shield supported by and spaced from the casing and at least partially enclosing the microphone and amplifier, a guard member disposed over the casing and shield in front of the microphone and spaced therefrom, said casing, shield, and guard being apertured to provide a low impedance acoustic channel to the microphone, and electric connector supported by the casing but separated from the microphone by elastic compliant means, and spring clamping means having compliant pads to hold an electric cord at spaced points along the casing.

2. In a hearing aid, a microphone, a vacuum tube amplifier, a casing substantially enclosing the microphone and amplifier but having an acoustic aperture before the microphone, a metal casing within the first mentioned casing to a large extent enclosing the amplifier, said microphone and amplifier each being supported upon one of said casings, a rubber-like filling spacing said casings from each other, and a guard supported by one of the casings and disposed over the outer casing in front of but spaced from said acoustic aperture therein.

3. In a hearing aid, a microphone, a vacuum tube amplifier, a metal casing substantially enclosing the microphone and amplifier but having an acoustic aperture overlying the microphone, a chassis mounted in said casing on compliant elastic supports, said microphone and amplifier being mounted on the chassis, a panel mounted in said casing on compliant elastic supports, an electric connector mounted on the panel, flexible leads interconnecting said connector and the amplifier, an outer shell surrounding and substantially enclosing the casing but having an acoustic aperture overlying the microphone and having an opening over the electric connector large enough to admit another electric connector without touching said outer shell when the connector on the panel is in its equilibrium position, a smooth acoustically pervious guard affixed to the shell and overlying but spaced from the shell near the microphone, and means including a plurality of compliant pads for holding an electric cord along one side of the hearing aid.

4. In a hearing aid, a microphone, a vacuum tube amplifier, a first metal casing supporting and substantially enclosing the microphone and amplifier, and a second metal casing surrounding the first metal casing, said both sides of the first casing being recessed and the adjacent sides of the outer casing being conjugately shaped, said outer casing being of spring-like construction and adapted to snap over the first casing with said recessed and adjacent sides interlocked.

5. In a hearing aid adapted to be worn in contact with a portion of a wearer's clothing: a case including an acoustic aperature; and a guard including a portion for engaging said case and cooperable therewith to form a clamp for holding a portion of said wearer's clothing immobile relative to said case and relative to said acoustic aperture, and further including a grilled shield portion of bowed configuration subtending said immobilized clothing portion and projecting away from said case and said immobilized clothing portion when said guard is positioned on said case to prevent other clothing portions from contacting said immobilized portion.

6. In a hearing aid adapted to be worn in contact with a portion of a wearer's clothing: a case including an acoustic aperture; and a guard including clamping portions for engaging said case at points remote to said acoustic aperture for supporting said guard on said case, including other portions cooperating with said case to form a clamp for holding a portion of said wearer's clothing immobile relative to said case and relative to said acoustic aperture, and further including a grilled shield portion of bowed configuration subtending said acoustic aperture and projecting away from said case when said guard is positioned on said case to shield said case from other clothing of the wearer.

7. In a hearing aid adapted to be worn in contact with a portion of a wearer's clothing: a case including an acoustic aperture; and a guard including parallel clamping surfaces for engaging said case at opposite sides of said acoustic aperture and cooperable with said case to form a clamp for holding a portion of said wearer's clothing immobile relative to said case and relative to said acoustic aperture, and further including a grilled shield portion of bowed configuration subtending said immobilized clothing portion and projecting away from said case to prevent other clothing portions from contacting said immobilized portion.

8. In a hearing aid adapted to be worn in contact with a portion of a wearer's clothing: a case including an acoustic aperture; and a resilient guard including cooperating jaw sections spaced apart by a distance less than the dimension of said case in a direction transverse to said acoustic aperture, said jaw sections and said case constituting a clamp for supporting said case on a portion of said wearer's clothing, and for holding said portion immobile relative to said case and relative to said acoustic aperture, and said guard further including a grilled shield portion of bowed configuration subtending said immobilized clothing portion and projecting away from said case when said guard is positioned on said case to prevent other clothing portions from contacting said immobilized portion.

9. In a hearing aid adapted to be worn in contact with a portion of a wearer's clothing: a case including an acoustic aperture; and a guard including a portion for engaging said case and cooperable therewith to form a clamp for holding a portion of said wearer's clothing immobile relative to said case and relative to said acoustic aperture, further including a grilled shield portion subtending said immobilized clothing portion and projecting away from said case when said guard is positioned on said case to prevent other clothing portions from contacting said immobilized portion, and said guard still further including a second shield portion projecting away from said case at the top thereof when said hearing aid is worn to prevent articles of clothing from contacting said top.

10. In a hearing aid adapted to be worn in contact with a portion of a wearer's clothing and including a case having an acoustic aperture, a guard comprising: a pair of clamping surfaces for engaging said case at opposite sides of said acoustic aperture to support said guard on said case; and at least one elongated shield member supported at each end by one of said clamping surfaces and projecting away from said case when said guard is positioned on said case to prevent other clothing portions from contacting said case.

HUGH S. KNOWLES.

REFERENCES CITED

The following references are of record in the file of this patent:

UNITED STATES PATENTS

| Number | Name | Date |
|---|---|---|
| 1,496,768 | Booth et al. | June 10, 1924 |
| 1,876,117 | Weinberger | Sept. 6, 1932 |
| 1,901,065 | Spotts | Mar. 14, 1933 |
| 1,987,413 | Olson | Jan. 8, 1935 |
| 2,165,124 | Ballantine | July 4, 1939 |
| 2,182,632 | Kiernan | Dec. 5, 1939 |
| 2,253,216 | Wengel | Aug. 19, 1941 |
| 2,327,320 | Shapiro | Aug. 17, 1943 |
| 2,336,828 | Zarth | Dec. 14, 1943 |
| 2,351,400 | Carlisle | June 13, 1944 |